Figure 1:
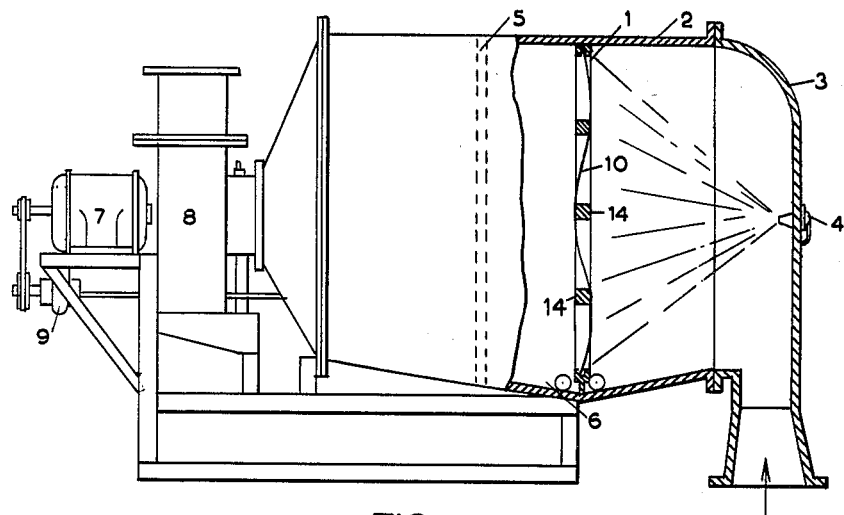

May 29, 1962 E. MARÉ ET AL 3,036,417
GAS SCRUBBING AND LIKE OPERATIONS
Filed Feb. 23, 1960

INVENTORS
Ernest MARÉ
Edward L. BATEMAN

By Watson, Cole, Grindle & Watson

United States Patent Office 3,036,417
Patented May 29, 1962

3,036,417
GAS SCRUBBING AND LIKE OPERATIONS
Ernest Maré and Edward Laurence Bateman, Braamfontein, Johannesburg, Transvaal, Union of South Africa, assignors to Airfilpat Holdings (Proprietary) Limited, Johannesburg, Transvaal, Union of South Africa
Filed Feb. 23, 1960, Ser. No. 10,271
Claims priority, application Union of South Africa Mar. 6, 1959
20 Claims. (Cl. 55—29)

This invention which is a continuation-in-part of our co-pending patent application Serial No. 862,162, now abandoned, relates to gas scrubbing operations for removal of solid or liquid particles entrained in a gas stream and/or for removal of soluble gaseous constituents of a gas stream. It is also generally applicable to any like gas treatment operations which require basically an intimate contact between a gas and liquid. Such operations may include effecting heat exchange between a gas stream and a liquid or the drying of a liquid saturated or partially saturated gas stream by contact with a chilled liquid.

In the main application of this invention namely to the scrubbing of a gas to remove entrained solid particles it is necessary that they be wetted, normally by water, so that they will be deposited as a sludge which can then easily be removed. The efficiency of collection will thus depend on the proportion of the total number of particles which are wetted in the apparatus, and in general for most fine dusts the only effective method of wetting is by the projection of liquid sprays into the gas stream. It will be clear that the efficiency of wetting will depend on the probability of liquid particles coming into contact with each dust particle, and this in turn will depend on various factors but mainly on:

(a) The number of liquid particles in the gas stream,
(b) The time available for contact between the liquid and solid particles, and
(c) The difference in speed and/or direction of travel of the liquid particles in relation to the solid particles.

Factors a and b are determined largely by economic considerations, but in any case are of negligible importance if factor c is not present since no wetting contact can be effected if adjacent separated liquid and solid particles continue to travel through the apparatus in the same direction and the same speed. The use of labyrinthine passages in the scrubber will generally ensure that factor c assumes its proper importance in the apparatus but at the cost of increased power consumption due to the large pressure drop through these passages, and is generally the object of this invention to provide a simple method for carrying out scrubbing and like gas treatment operations which will avoid the use of labyrinthine passages and consequent large pressure drop, while still maintaining collection efficiency at a high level.

In accordance with this invention there is provided a method for treating a gas stream by intimate contact with a liquid which comprises directing the gas stream through an apertured partition member, while simultaneously spraying the liquid onto said partition member in the direction of gas flow at a rate sufficient to ensure a visible atomised liquid rebound zone on the upstream side of the screen.

According to further features of the invention the liquid sprays are projected with a velocity component in the direction of gas flow appreciably greater than the velocity of gas flow, and the partition member may comprise a parallel bar of wire screen or a wire mesh screen a perforated plate.

The invention is illustrated diagrammatically in the accompanying drawings in which:
FIG. 1 shows a scrubbing assembly, and
FIGS. 2 to 5 are fragmentary views of different types of screens which may be used.

As shown in FIG. 1 there is provided a parallel bar screen 1 extending across the area of the one arm 2 of a right angled duct 3. On the upstream side of the duct 3 one or more spray nozzles 4 are fitted and positioned to direct a spray onto the screen 1 generally in the direction of gas flow through the screen 1 as indicated by the arrow. On the downstream side of the screen is fitted a water eliminator 5 which may be of any conventional type.

The wetted material from the screen and eliminator is collected in a sump 6 fitted with a water seal (not shown). The unit illustrated in FIG. 1 is self-contained and accordingly fitted with a motor 7 driving a fan 8 and pump 9 for the spray nozzles 4.

The water is projected onto the screen 1 by the nozzles 4 in the form of a very fine spray directly impinging on the whole area of the screen 1 or at least wetting the whole area of the screen. Generally it is found that at least one gallon of water is required per 400 cubic feet of gas, more water being required when the particles are at extremely high temperatures. The water is projected under high pressure preferably in excess of 50 pounds per square inch and generally between 75 and 200 pounds per square inch, and accordingly at high velocity.

The velocity of the water projection should be such that there is a visible mist or atomised liquid rebound zone on the upstream side of the screen 1 and of substantial depth. It is preferred to maintain the depth of the rebound zone at least about 1" and preferably up to about 4". This zone is caused by the high velocity water droplets hitting the screen members and breaking into very minute droplets which travel backwards against the air stream with a correspondingly high degree of probability of capture of solid particles in the gas stream. If the water droplets travel at the same velocity as, or a lower velocity than the gas stream, they tend to be drawn by the gas stream through the interstices in the screen without making contact with the screen and even if the water is projected at a higher velocity but insufficient to cause a visible and appreciable atomised liquid rebound zone there is an appreciable falling off in the efficiency of the scrubbing operation. Thus, to obtain a very effective rebound zone it is necessary for the minimum velocity component of the sprays in the direction of gas flow to be appreciably greater than, and generally many times the velocity of the gas stream.

For example with a gas stream velocity of 500 feet per minute the sprays could have a velocity component in the direction of gas flow of about 4000 feet per minute. The velocity of the sprays relative to the gas stream may be reduced below the above figure but will generally appreciably exceed it.

In addition to capture or wetting of particles in the rebound zone further wetting and agglomeration occurs by the rapid acceleration of the particles through the screen 1 followed by rapid deceleration, the acceleration and deceleration being different for the two types of particles due to their differing densities and sizes.

While the wetted and agglomerated particles will tend to drop from both sides of the screen 1 it is preferred to use the water eliminator 5 particularly for collection of wetted particles sufficiently small still to be buoyant in the gas stream. These particles and others which have not dropped are collected by impingement on the water eliminator.

Figure 2:
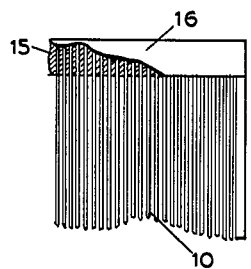
Figure 3:
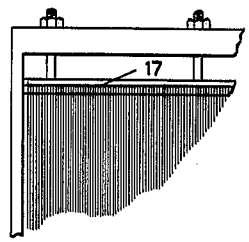

The bars 10 in the screen which may be of the type illustrated in FIGS. 1 or 2 may be for example of 1/8" diameter and spaced 1/8" apart. The normal pressure drop through such a screen is generally about 1/10" water gauge at reasonably high gas velocities with collection efficiency in the neighbourhood of 90% or higher.

Where higher efficiencies are required the screen may be made of tensioned vibrating wires 11 spaced for example less than 200 microns apart as illustrated in FIG. 3. While such a screen will result in very high collection efficiencies with low pressure drop through the screen it has a disadvantage that wear of the wires 11 occurs due to them rubbing against each other and against abrasive particles when they vibrate under the influence of the gas stream. The wires 11 are also not as easily replaced as bars 10.

Figure 4:
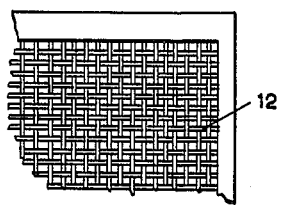
Figure 5:
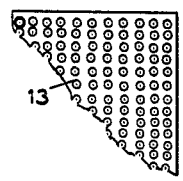

While it is preferred to use a screen consisting solely of upwardly extending longitudinal screening members such as bars it is also possible to use a normal wire mesh screen 12 as illustrated in FIG. 4 or even a perforated plate 13 as illustrated in FIG. 5.

In the screen shown in FIG. 1 the bars are sprung into position and held spaced apart by transverse members 14 which are suitably staggered and slotted to locate the bars and with the adjacent members 14 positioned on opposite sides of the bars in the known manner. In the screen shown in FIG. 2 the bars 10 are merely located at the ends in corrugated packing strips 15 pressed into channels 16 forming part of the screen frame. In the screen shown in FIG. 3 the wires 11 are anchored to the top and bottom screen members 17 which are pulled apart to place the wires under tension.

While the liquid projected onto the screen will normally be water other liquids may be used. For example, in carrying out screening operations in the drives of mines it has been found advantageous to use sprays of potassium permanganate solution, which in addition to wetting solid particles in the air stream passing through the drives, also acts to oxidise nitrous fumes in the air stream, these fumes occurring as a result of blasting operations.

Since the efficiency of the scrubbing operations described above are dependent on the probability of contact between solid and liquid particles due to a large extent to the existence of the rebound zone of extensively atomised liquid travelling against the direction of gas flow, it follows that the invention is also in general applicable to other methods of gas or liquid treatment which require similar conditions. For example the invention is applicable to the scrubbing of a gas stream which contains one or more constituents soluble in the liquid sprayed onto the screen irrespective as to whether or not the gas stream contains solid particles. Such applications are for example the removal of sulphur trioxide from a gas stream by the spraying of oleum jets onto the screen through which the gas passes, the removal of carbon dioxide with alkali hydroxide or carbonate solutions or aqueous organic amine solutions, and the absorption of sulphur dioxide with alkali carbonate solution jets directed onto the screen.

Similarly a gas stream may be evaporatively cooled (and if desired simultaneously scrubbed) by the use of water sprays. Conversely and in a similar manner a liquid may be cooled by a gas stream of lower temperature than the liquid. In such applications the discharged gas is saturated or at least will have a high vapour content. However, since the vapour content of a gas may be reduced by water cooling of the gas this invention may be applied to the drying of a saturated or partially saturated gas in which case chilled water sprays are used. Also the vapour content of a gas can be increased in a similar manner by the use of this invention using liquid sprays directed onto the screen the temperatures of the liquid and/or gas stream being controlled relative to each other to achieve the desired increase in vapour content of the gas stream.

What we claim as new and desire to secure by Letters Patent is:

1. A method for effecting intimate contact between a liquid and a gas stream which comprises directing the gas stream through a confined zone having an apertured partition member arranged therein generally across the direction of gas flow and extending the full cross-sectional area of said zone, said apertures permitting the unobstructed flow of gas therethrough substantially parallel to the direction of gas flow and simultaneously projecting onto the partition member in the direction of gas flow a very fine spray of liquid to wet the full area of said member, said liquid being projected at a pressure of at least 50 p.s.i. and at a rate substantially greater than that of the gas stream to establish in the vicinity of the member on the upstream side thereof a visible zone of atomized liquid particles rebounding from the solid portions of the member generally in opposition to the direction of gas flow, said zone of rebounding particles extending over the full area of the member and having substantial depth in the direction of gas flow.

2. A method as claimed in claim 1 in which an assembly of parallel bars is used as a partition member.

3. A method as claimed in claim 1 in which an assembly of closely spaced tensioned parallel wires is used as a partition member.

4. A method as claimed in claim 1 in which a wire mesh screen is used as a partition member.

5. A method as claimed in claim 1 in which a perforated plate is used as a partition member.

6. A method as in claim 1 wherein said gas stream includes a gaseous constituent to be removed therefrom, said gaseous constituent being soluble in said liquid and including the step of collecting the liquid containing said constituent dissolved therein after said liquid has been contacted with said gas stream.

7. A method as in claim 1 adapted to effect heat exchange between said gas stream and said liquid wherein said liquid being projected has an appreciably different temperature from that of the gas stream.

8. A method as in claim 1 adapted for dehumidifying said gas stream, said gas stream containing a high proportion of the liquid vapor, wherein said liquid being sprayed is in a chilled condition relative to said gas stream.

9. A method as in claim 1 adapted for humidifying said gas stream, said gas stream being relatively free of moisture, wherein relative temperatures of the stream and liquid are controlled to vaporize at least a portion of said liquid into the gas stream.

10. The method of claim 1 wherein said partition member is arranged in said zone substantially at right angles to the direction of gas flow.

11. The method of claim 1 wherein said liquid is projected at a rate equal to at least about one gallon per 400 cubic feet of gas flowing through said zone.

12. The method of claim 1 wherein said liquid is projected with a velocity component parallel to the direction of gas flow having a ratio of at least about 8:1 to the velocity of the gas stream through said zone.

13. A method of gas scrubbing for removing particles entrained in a gas stream which comprises passing said gas stream through a confined zone having a screen arranged therein generally across the direction of gas flow and extending the full cross-sectional area of said gas zone, said screen defining a series of relatively closely spaced openings having every dimension thereof appreciably greater than the diameter of the largest particles to be wetted, said openings permitting the unobstructed flow of gas therethrough substantially parallel to the direction of gas flow, and projecting onto the screen in the direction of gas flow a very fine spray of liquid to wet the full area of said screen, said liquid being projected at a pressure of at least about 50 p.s.i. and at a velocity substantially greater than that of the gas stream to establish in the vicinity of the screen on the upstream side thereof a visible zone of atomized liquid particles rebounding from the solid portions of the screen generally in opposition to the direction of gas flow, said zone of rebounding particles extending over the full area of the screen and having substantial depth in the direction of gas flow.

14. The method of claim 13 wherein said screen is arranged in said zone substantially at right angles to the direction of gas flow.

15. The method as in claim 13 wherein said visible zone of rebounding particles has a depth of at least one inch from the upstream side of the screen.

16. The method of claim 13 including the step of collecting the wetted particles passing the screen by a water eliminator discharging into a sump.

17. The method of claim 13 wherein said screen consists of a plurality of bars arranged in spaced parallel relationship, the spacing between said bars being appreciably greater than the diameter of the largest particles to be wetted.

18. The method of claim 13 wherein said screen consists of a plurality of wires maintained under tension in spaced parallel relationship, the spacing between said wires being appreciably greater than the diameter of the largest particles to be wetted.

19. The method of claim 13 wherein said screen comprises a reticule of wires, the openings thereof having an appreciably greater size than the diameter of the largest particles to be wetted.

20. The method of claim 13 wherein said screen is constituted by a perforated plate, the openings thereof having an appreciably greater size than the diameter of the largest particles to be wetted.

References Cited in the file of this patent

UNITED STATES PATENTS

| | | |
|---|---|---|
| 1,578,313 | Hencky | Mar. 30, 1926 |
| 1,640,564 | Burdick | Aug. 30, 1927 |
| 1,890,107 | Bowman | Dec. 6, 1932 |
| 2,057,579 | Kurth | Oct. 13, 1936 |